FIG. I

INVENTOR.
HERMANN BORGE FUNCK JENSEN
BY Dicke & Craig

ATTORNEYS.

INVENTOR.
HERMANN BORGE FUNCK JENSEN
BY Dicke & Craig
ATTORNEYS

INVENTOR.
HERMANN BORGE FUNCK JENSEN
BY Dicke & Craig
ATTORNEYS.

INVENTOR.
HERMANN BORGE FUNCK JENSEN

United States Patent Office 3,457,549
Patented July 22, 1969

3,457,549
METHODS FOR LAYING OUT AUTOMATION
Hermann Børge Funck Jensen, Klintegarden 1,
Arhus, Denmark
Continuation-in-part of application Ser. No. 689,620,
Oct. 11, 1957. This application Mar. 16, 1962, Ser.
No. 180,117
Claims priority, application Great Britain, Oct. 12, 1956,
31,087/56
Int. Cl. H04q 3/02
U.S. Cl. 340—147                                    11 Claims This is a continuation-in-part application of my application Ser. No. 689,620, filed Oct. 11, 1957, now abandoned, and relating to automatic control systems.

The present invention relates to the laying out of the sequence control of an automation system.

It is the purpose of the invention to provide an easy method for laying out the sequence control of the automation system to coordinate the utilization of a plurality of sensing switch means to produce data signals indicative of the progress of an automation cycle and a plurality of machine function actuators operable to initiate and terminate a respective machine function.

It is a further object of the invention to provide a method of interlocking machine functions and machine data for running a working machine having a plurality of machine function means and electrical actuators therefor and a plurality of sensing devices to effectively provide the electrical connections between a plurality of control outputs and machine function control inputs.

Still a further object of the invention is to provide a method which includes laying out a graphical illustration for connecting numerical control outputs which are effectively provided in the form of numerical values corresponding to data signals with machine control inputs to interlock data signals and machine functions.

It is still a further object of the invention to provide a chart having columns capable of effectively representing coincidental conditions which is a prerequisite for the production of a command signal to a machine control and intersecting columns representing the machine control whereby the intersection of said columns can be marked to directly indicate the wiring necessary to interlock data signals and machine functions.

Figure 1:
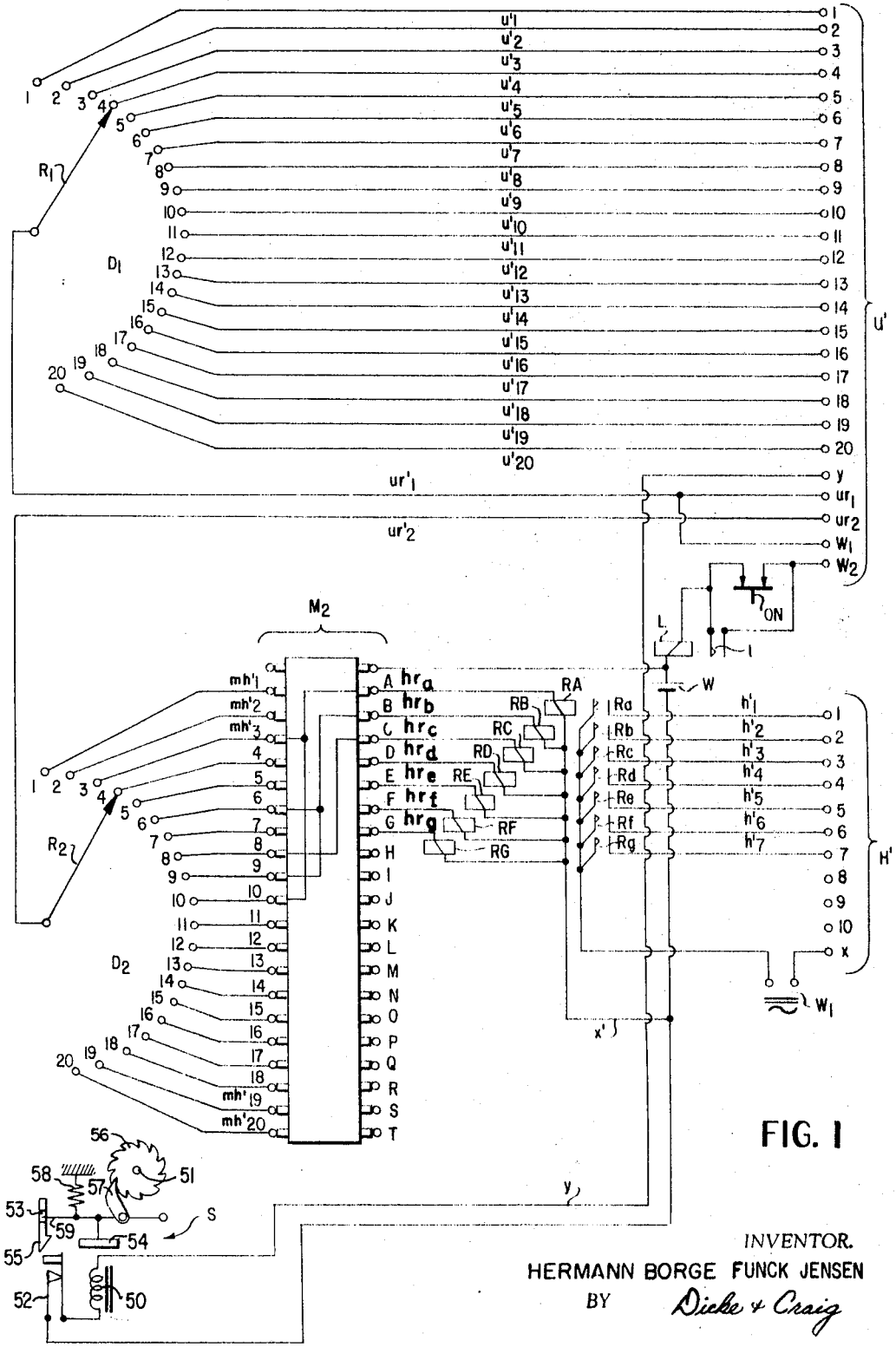
Figure 2:
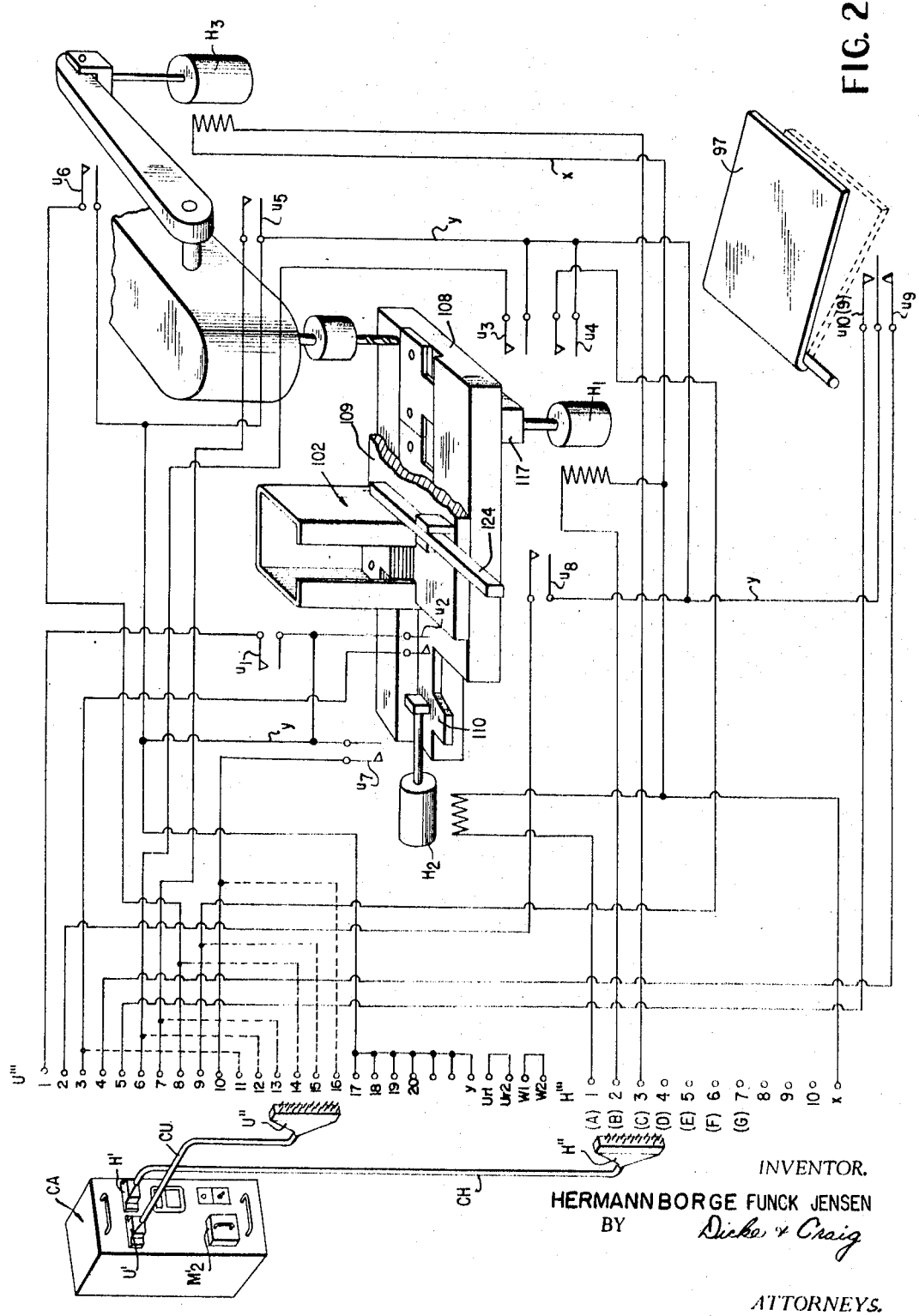
Figure 3:
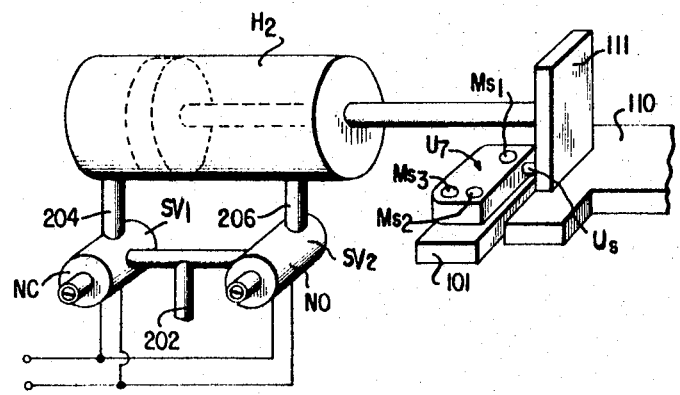
Figure 4:
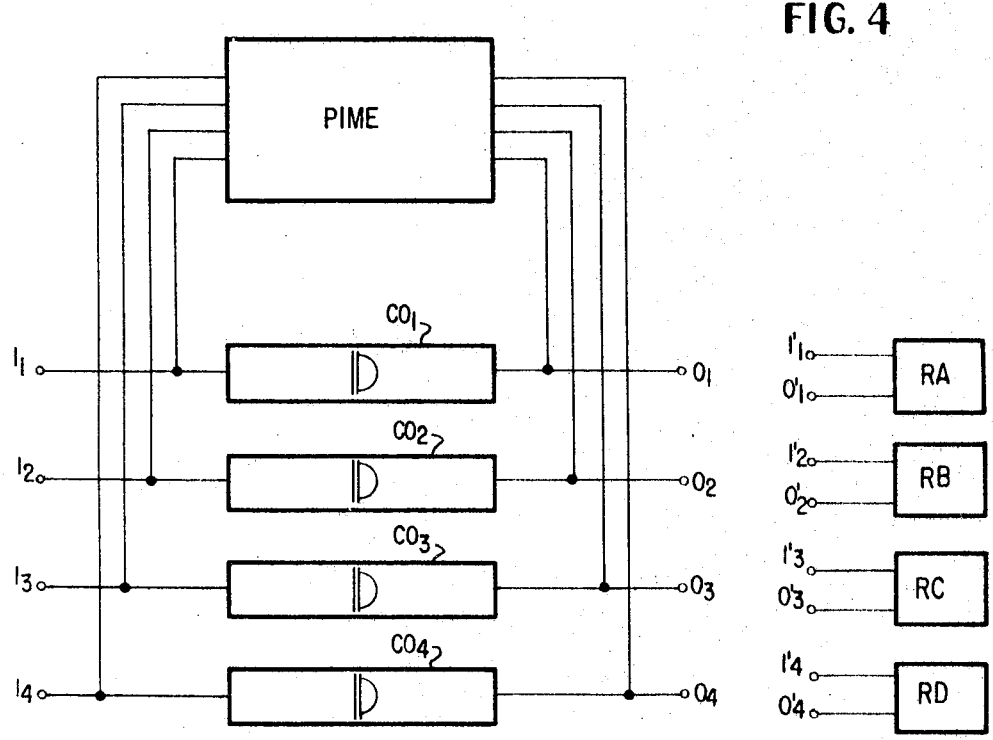

Further purposes and advantages of the invention will appear from the following description with reference to the accompanying drawing in which FIGURE 1 is a schematic diagrammatic illustration of a control apparatus to be used in a system in which data signals and machine functions are interlocked according to the invention, FIGURE 2 is a schematic illustration of a simple machine equipment for use with a control apparatus as shown in FIGURE 1, FIGURE 3 is a schematic perspective view of a part of the equipment of the machine shown in FIGURE 2, FIGURE 4 is a block diagram illustrating the basic elements of a system including the apparatus shown in FIGURE 1 and the machine equipment shown in FIGURE 2 in block form.

Figure 5:
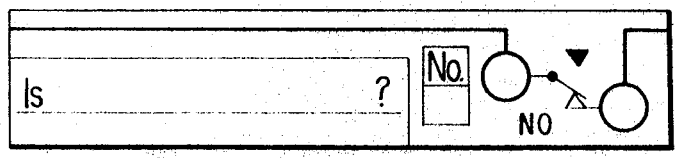
Figure 6:
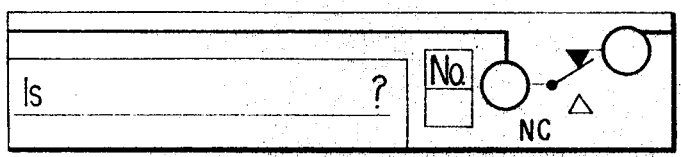
Figure 9:
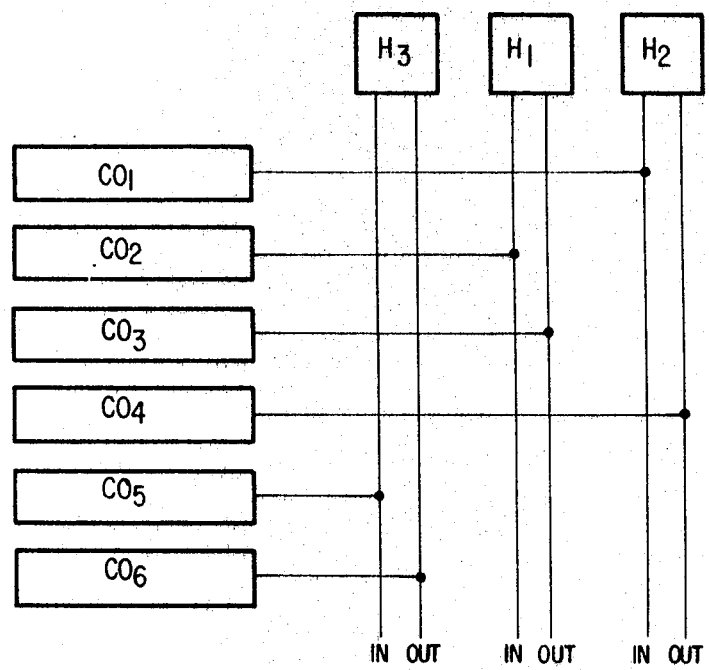
Figure 7:
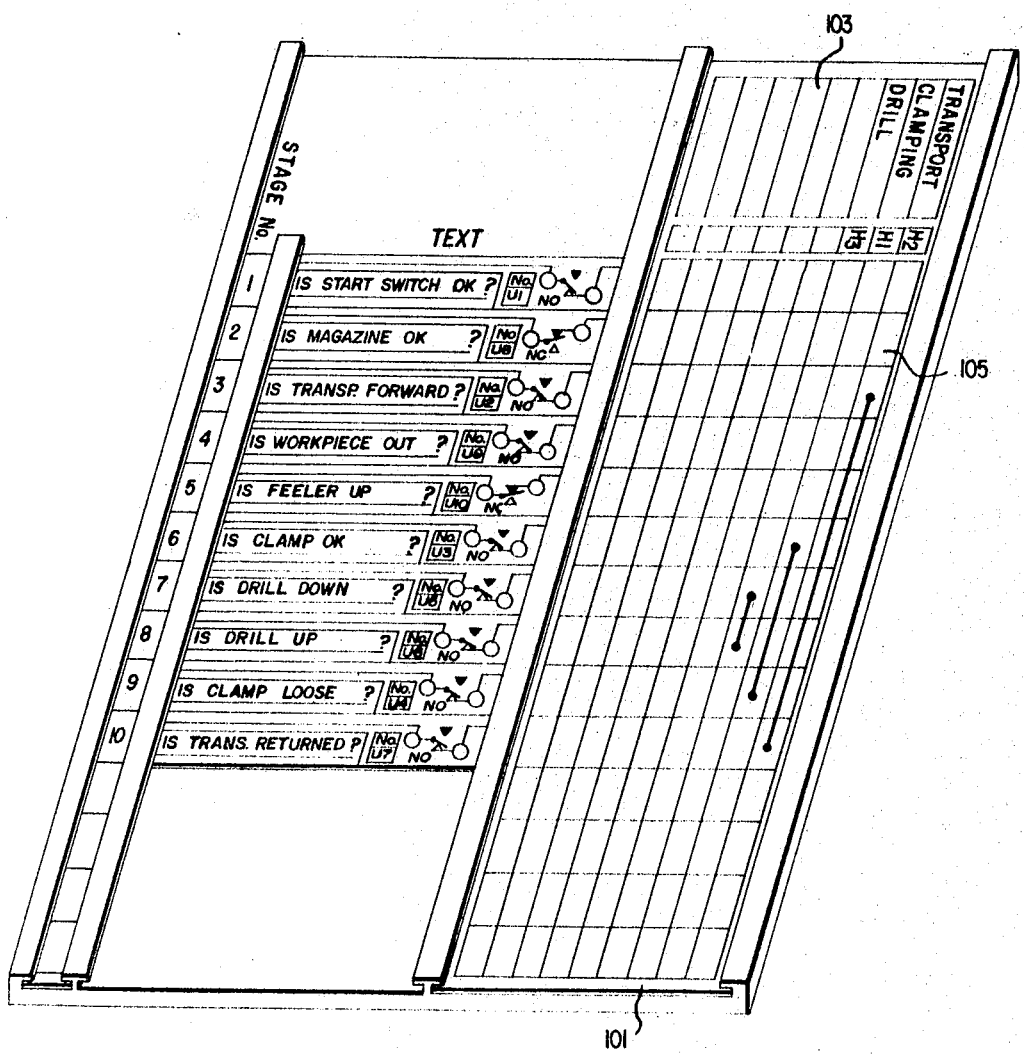
Figure 8:
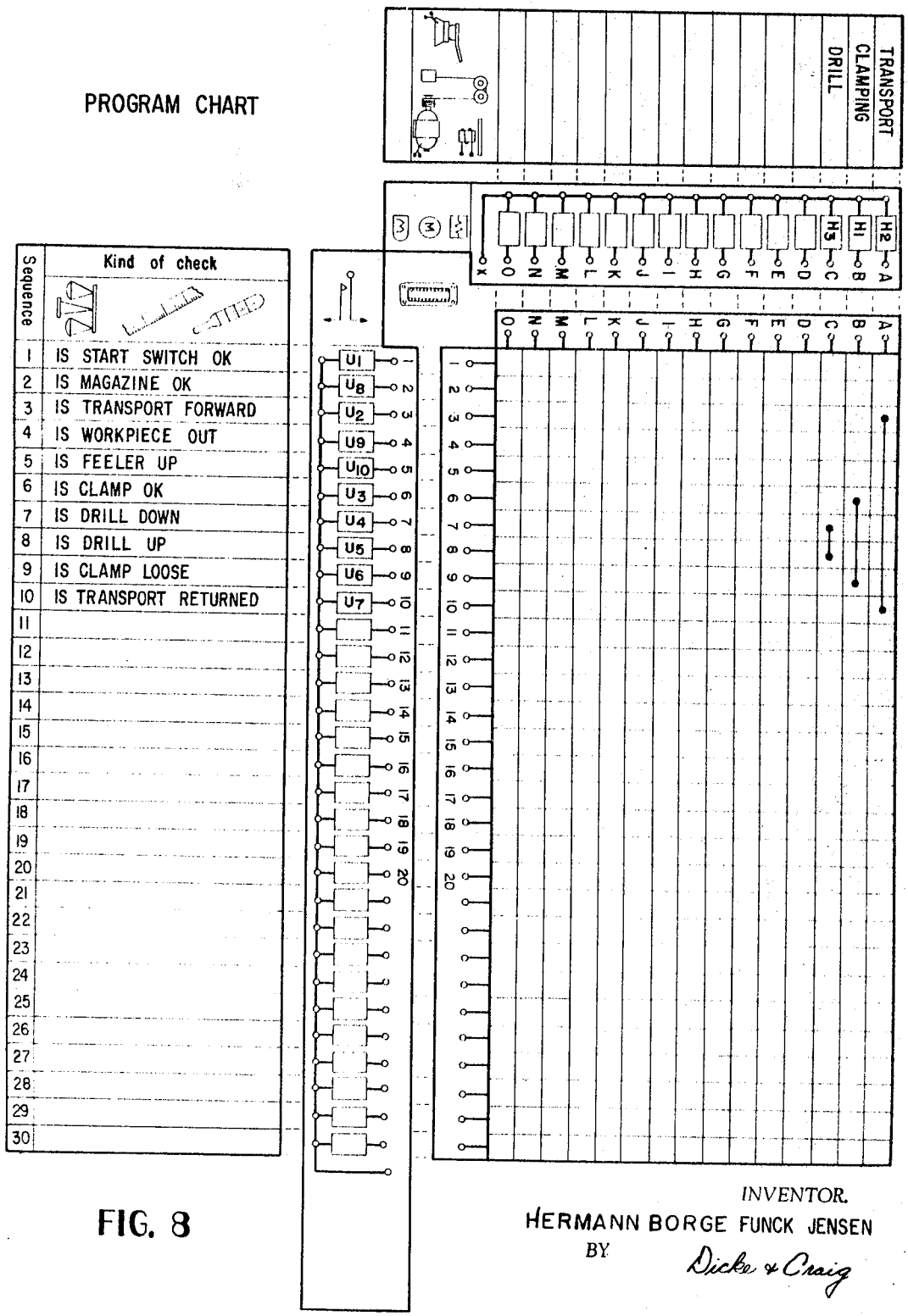
Figure 10:
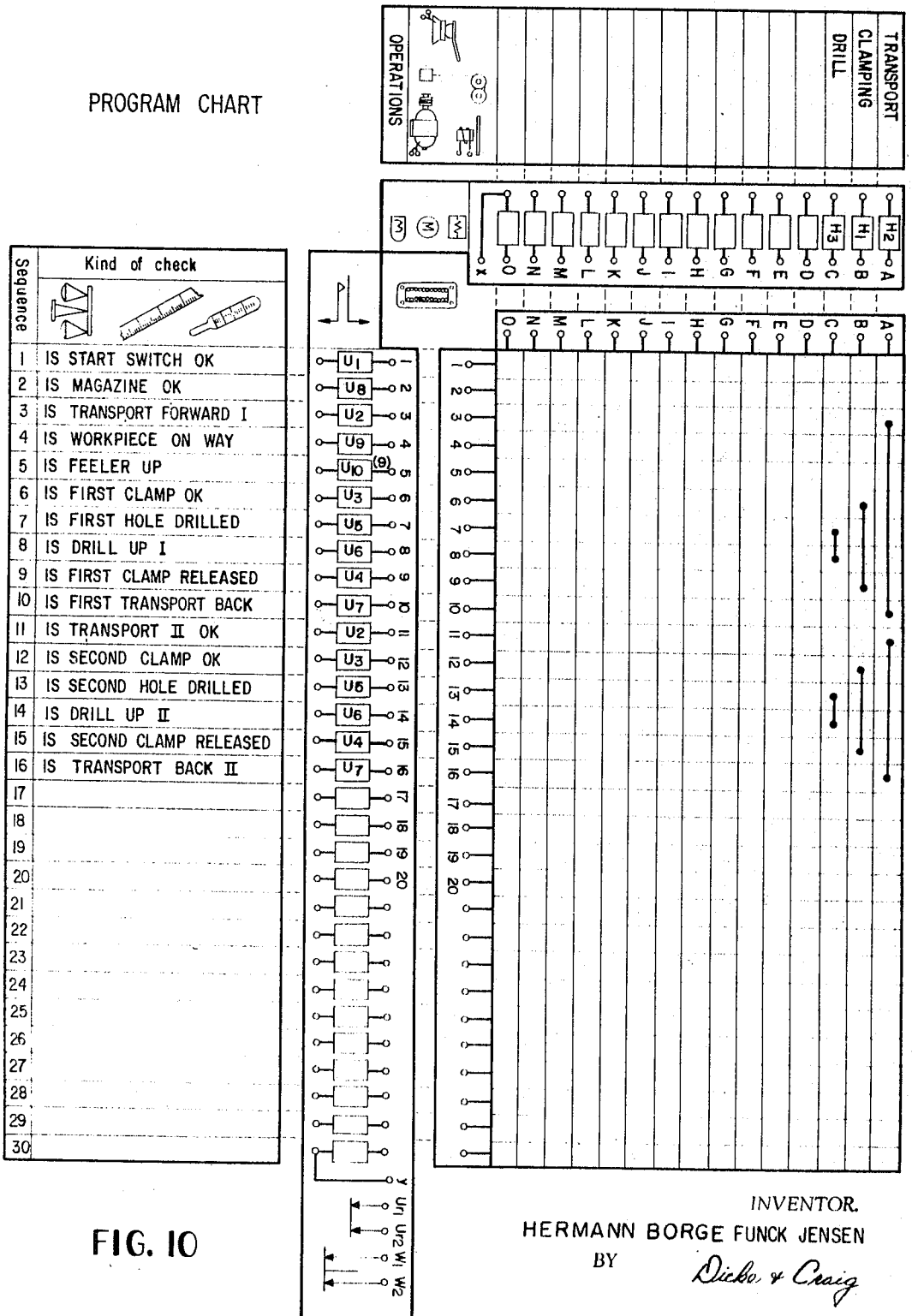
Figure 11:
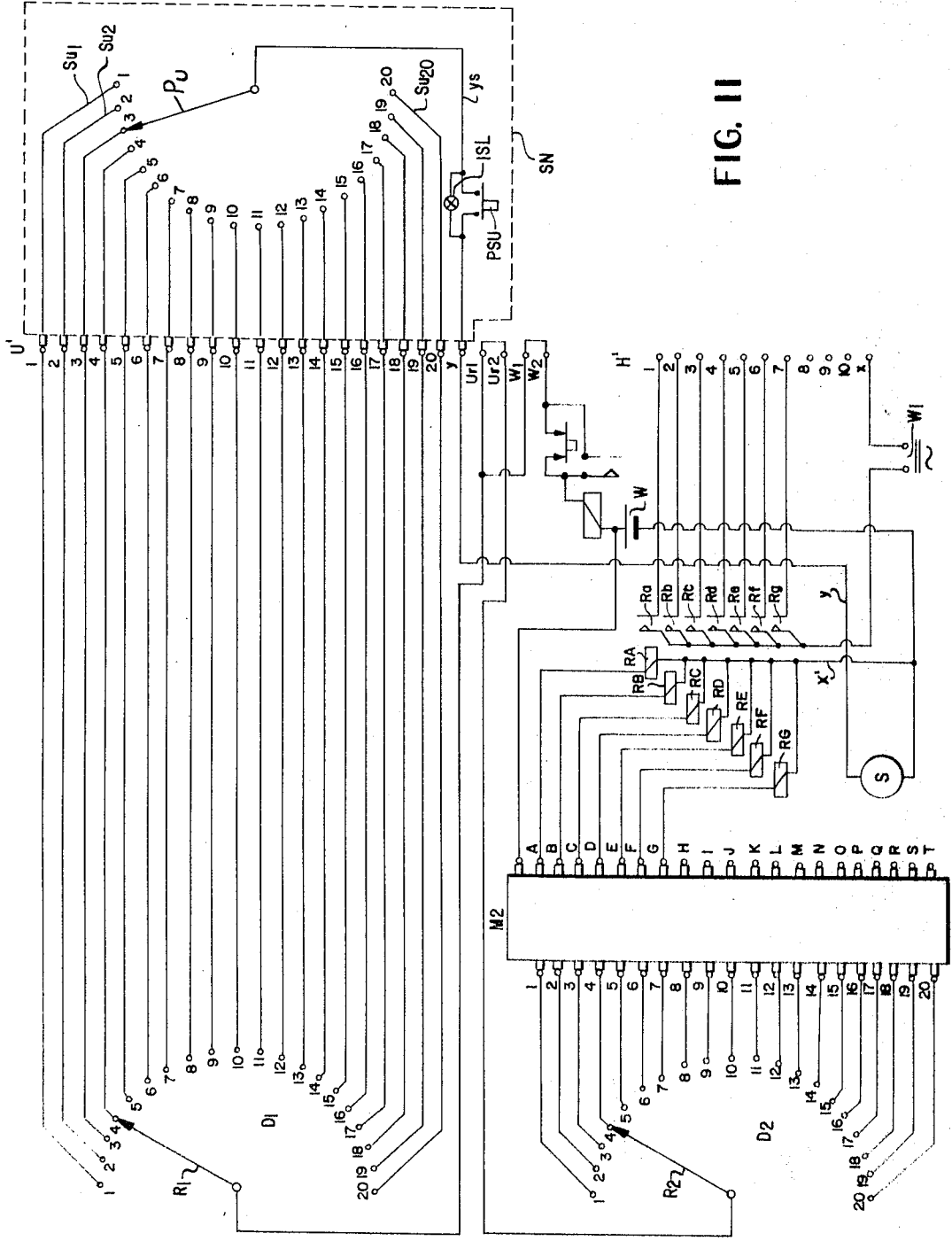

FIGURE 5 and FIGURE 6 are two different embodiments of strips used for laying out the automation of the machine shown in FIGURE 2 controlled by a control apparatus as shown in FIGURE 1 with correct interlocking of data and functions, FIGURE 7 is a part view of a support used for mounting strips as shown in FIGURES 5 and 6 marked to indicate thereon each prerequisite condtion necessary for a respective machine function, FIGURE 8 is a programme chart marked to provide the electrical connections for interlocking machine functions and data, FIGURE 9 is a simplified diagrammatic illustration of the system, FIGURE 10 is a modified programme chart, and FIGURE 11 is an illustration of the control apparatus shown in FIGURE 1 with addition of a fault finding circuit network.

The control apparatus shown in FIGURE 1 includes a progressive switch arrangement effectively providing a plurality of switch stages each of which represents a numerical value or a discrete step.

The progressive switch arrangement is included in a circuit arrangement having a plurality of inputs adapted to be connected with data signal outputs from a working machine to effectively render the data signals expressed by the numerical values of the progressive switch arrangement whereby the progressive switch arrangement effectively operates as an electrically controlled counter device, each stage of which is an expression of the sum of data signals which have been produced preceding the respective stage.

An important feature of the apparatus is that the effective switching stages of the progressive switch arrangement are adapted to be connected with respective data signal means on the working machine which are adapted to produce data signals indicative of prerequisite conditions for the progress of an automatic cycle of machine functions of the working machine in such a manner that the coincidence of a predetermined switching stage of the progressive switch arrangement and the operation of a predetermined corresponding data signal means on the working machine to produce a data signal is a prerequisite for advancing the progressive switch arrangement to the next following stage.

The control apparatus shown in FIGURE 1 furthermore includes a plurality of outputs which are rendered effective in sequence to transmit a command signal and a plurality of machine function control means.

The machine function control means has outputs to be effectively connected with machine function or operating performing members on the working machine and inputs adapted to be connected with the command signal outputs herein above mentioned for rendering the machine function conrtol operable to initiate a machine function in response to receipt of a first signal and to terminate the machine function in response to receipt of a second signal.

The present invention is especially concerned with providing the electrical connections between the counter outputs or outputs from the progressive switch arrangement and the machine function controls to interlock machine functions and machine data in a manner to be more fully described in the following.

In more specific terms the control apparatus shown in FIGURE 1 includes a first progressive switch arrangement generally referred to by $D_1$ with indexing means generally referred to by S effectively providing the counter function, and a second progressive switch arrangement generally referred to be $D_2$ effectively providing command signal outputs and a plurality of relay means RA, RB . . . effectively providing machine function controls and being of the type having an operable and an inoperable condition to be alternately achieved upon receipt of consecutive signals.

The progressive switch arrangement or counter device is in FIGURE 1 shown as a simple stepping switch having the two decks $D_1$ and $D_2$ with movable indexing fingers $R_1$ and $R_2$ movable in synchronism by means of the indexing device S so as to be sequentially indexed from one stage to the next following stage.

The contacts of the deck $D_1$ are through a plurality of data signal lines $u'_1$, $u'_2$ ... connected to a plurality of terminals numbered 1–20 of a socket or similar connector member having complementary connector parts adapted to be connected with a cable to establish connection with corresponding data signal lines of the machine equipment to be more fully described in the following.

The deck $D_2$ has its contacts connected through a plurality of command signal lines $h'_1$, $h'_2$ ... to a plurality of command signal output terminals $mh'_1$, $mh'_2$ ....

In addition to the twenty terminals mentioned hereinabove the socket U' includes a terminal $y$ which through a line designated also by $y$ is connected through the indexing means S to one terminal of a voltage source W.

In addition the socket U' has four terminals marked $ur_1$, $ur_2$ and $w_1$ and $w_2$. The terminal $ur_1$ is connected through a line $ur'_1$ to the finger $R_1$ of the deck $D_1$. The terminal $ur_2$ is through a line $ur'_2$ connected with the finger $R_2$ of the deck $D_2$ of the progressive switch arrangement.

The terminal $w_1$ is connected to the line $ur'_1$ and the terminal $w_2$ is through a push-button switch ON which is shunted by a relay switch $l$ operable to provide a holding circuit upon release of the push-button switch ON connected to the winding of a relay L the other end of which is connected to the other terminal of the voltage source W.

The indexing or advancing arrangement S is of the indirect driven type which causes the rotary wipers $R_1$ and $R_2$ to be advanced from one stage to the next following stage in response to release of an armature. The drive includes a ratchet wheel 56 firmly secured on a spindle 51 which also carries the rotary wipers $R_1$ and $R_2$. The ratchet wheel is indexably movable by a ratchet 57 which is tiltably supported by an arm 59 and by means of a spring (not shown) can come into engagement with the ratchet wheel. The arm or lever 59 is provided with an armature 54 adapted to be attracted by a driving solenoid 50 which is included in the $y$-line in series with a normally closed switch 52. A reciprocable member is provided with a cam surface 55 operable in response to downward reciprocation of said member to open the switch 52. The left hand end of the lever 59 operates to reciprocate the cam member 55 downwardly to open the switch 52 in response to energization of the solenoid 50. A sufficiently full stroke of the lever 59 with the armature is assured by a play 53 between the left hand end of the lever 59 and the cam member 55. The advancement of the ratchet wheel is caused by a spring 58 which is connected with the lever 59 at a fixed point. Briefly the mode of operation of this indexing structure is as follows:

When in response to the coincidence of a predetermined stage of the progressive switch arrangement and operation of a corresponding respective data signal means of the working machine a data signal is transmitted through the $y$-line, the solenoid 50 is energized and attracts the armature 54 whereby the lever 59 is pivoted and initially tensions the spring 58. During further tensioning of the spring 58 the lever 59 reciprocates the cam member 55 downwardly, whereby the switch 52 is opened. At that stage the ratchet 57 has engaged the next tooth of the ratchet wheel 56. The opening of the switch 52 deenergizes the solenoid 50 whereby the armature 54 is released and together with the lever 59 pivoted outwardly by the action of the spring 58 to effectively advance the progressive switch one step at which the arrangement is conditioned for the next following stage.

It will be obvious that by connecting the terminals $ur_1$ and $ur_2$ as well as the terminals $w_1$ and $w_2$ of the plug U' the second deck $D_2$ will during progressive advancement of the progressive switch arrangement in addition to the counting of the stages, effectively provide a second progressive switch function with a plurality of stages at each of which a signal is effectively applied to each of the terminals $mh'_1$, $mh'_2$ ... which provides terminals of a first group from which the signals to interlock data and machine functions through distributor means $M_2$ to be provided according to the present invention to the machine function control represented by the relay means RA, RB ....

In FIGURE 1 the windings of these relays are shown connected through lines $hr_a$, $hr_b$ ... to terminals A, B, C ... of a second group. The other end of the relay windings are connected with a common line $x'$ which is connected with the negative terminal of the voltage source W.

The voltage source W which shown in the form of a battery may be in the form of a suitable power pack adapted to supply the circuit arrangement with a suitable voltage, for example low voltage such as 24 volts and in such event the power pack includes suitable transformer means, rectifiers, filters and the like.

The relay means RA, RB ... are shown having contacts $R_a$, $R_b$, $R_c$ ... all of which are connected to one side of a separate voltage supply $W_1$ such as a supply mains, the other side of which is connected to a common line $x$. The other terminals of the relay contacts $R_a$, $R_b$ ... are individually connected through corresponding command signal lines $h'_1$, $h'_2$ ... to respective terminals 1–7 of another connector socket or suitable connector member having complementary connector terminals adapted to be connected through a cable to respective corresponding command signal lines of the machine equipment.

As mentioned hereinabove each of the relay means RA, RB ... has two stages, namely an operative stage at which the respective relay contact is closed and an inoperative stage at which the relay contact is open, these stages being obtainable in response to receipt of consecutive signals.

The relays may be of the impulse sensing type which will attract their armatures when energized and maintain the armatures attracted until they receive a new signal. Such types of relays are known in different commercial embodiments and therefore their construction and mode of operation is believed to be well-known to those skilled in the art and will not be described in any greater detail. It will be obvious, however, that the relays may be of the type in which the armature is mechanically attracted or the relay windings may be included in electronic circuits providing the bistable operation in response to receipt of consecutive discrete signals, either alternatively through one single input or through two different inputs.

The layout of the automation and the method of interlocking machine functions and machine data will now be described with reference to FIGURES 2 and 3.

As an example of the machine to be automated a drilling machine is taken because it is probably one of the most common machine tools, but it will be obvious that the invention is not limited to the automation of a machine tool, and it will be obvious from the following description that any working machine, which term also includes a chemical plant, may be conditioned for automation in the manner to be described in the following.

In FIGURE 2 the control apparatus shown in FIGURE 1 is illustrated as a plug-in control unit generally referred to by CA to indicate the connection from the socket U' through a cable CU to a plug U'' to provide connection to the machine equipment, and the socket H' connected through a cable CH to a plug H''. The control apparatus indicated in FIGURE 2 also is shown provided with the distributor means $M_2$ (FIG. 1), the mode of wiring of which to interlock data and machine functions will be more fully described in the following.

The equipment shown on the drilling machine of FIGURE 2 includes a magazine 102 for a stack of workpieces, the lowest of which is located in a transport channel at the top surface of a table 108 below a cover plate 109. The forward transport and push-out after the drilling operation is effectuated by means of a reciprocable slide 110 which moves in the rear end of the feeding channel and is controlled by means of a pneumatic or hydraulic cylinder $H_2$.

In order to clamp the workpiece during the drilling operation a clamping member or pressure shoe 117 is provided below the table 108 adapted to engage the workpiece from the underside through an aperture in the table 108 and to render the clamping member effective and ineffective another pneumatic or hydraulic cylinder $H_1$ is provided.

The up and down movement of the drill is controlled by means of a third pneumatic or hydraulic cylinder $H_3$.

The movement of the pistons in each of the cylinders is controlled by means of pressure fluid from a pipeline 202 such as shown in FIGURE 3. The pipeline 202 has branches 204 and 206 communicating with each end of the cylinder $H_2$. In order to control the access of pressure fluid to the cylinder, solenoid valves $SV_1$ and $SV_2$ respectively, are included in each of the branches 204 and 206 of the pipeline.

Such hydraulically or pneumatically operable cylinders for automatic control as well as solenoid valves are available in a plurality of commercial embodiments.

In the case of automation of a working machine by means of cylinders and control of pressure medium to the cylinders or by means of any other electrically controlled machine function members, also the sensing usually exerted by the operator in the case of manual control has to be automatically provided and to this purpose sensing devices must be included in the machine equipment adapted to produce information signals or machine data as prerequisites of the process of the automatic cycle of machine functions.

My invention provides for the interlocking of machine functions and data signals to enable the automatic control by rendering the progressive switch arrangement effectively operable as a counter device in response to feedback data signals.

In the embodiment shown in FIGURE 2 the sensing devices are supposed to be in the form of microswitches, such as commercially available, but it will be obvious that the invention is not limited to the use of microswitches and that any other sort of sensing devices which may include complex electronic networks or the like capable of producing a data signal in response to a prerequisite condition of the machine may be applied within the scope of the invention.

FIGURE 3 indicates the arrangement of one of the sensing switches referred to by $U_7$ to be actuated in the neutral or inoperative position of the piston of the cylinder $H_2$. The microswitch is mounted on a relatively stationary part 101 behind the reciprocable slide 110 in such a position that its switch control member $U_s$ is engaged by an abutment 111 on the reciprocable slide 110 when the slide has been retracted.

The commercially available microswitches usually have three terminals marked according to a standard coding as 1, 2 and 3 and as referred to in FIGURE 3 as $Ms_1$, $Ms_2$ and $Ms_3$. Those skilled in the art will thereby know that when the control member $U_s$ is inactivated, or non-actuated, the switch effectively provides a normally open switch between the terminals $Ms_1$ and $Ms_2$, usually known as a NO-type switch, and a normally closed switch between the terminals $Ms_1$ and $Ms_3$ usually known as an NC-type switch.

In the planning of the automation of the machine shown in FIGURES 5, 6, and 7 it is obvious that sensing switches must be provided to signal each of the end positions of the three control members $H_1$, $H_2$ or $H_3$.

It will also be obvious from a simple analysis of the functions carried out by manual control of the machine that the operator will sense visually whether there are workpieces in the magazine 102 and whether the forward transport of the workpieces is carried out. The forward transport obviously results in throwing out the workpiece which has been acted upon.

In order to provide a safe automatic control of the machine a workpiece sensing device is shown included in the machine equipment (FIG. 2) comprising a pivotable lever 124 which is spring-loaded and has a finger or the like which engages the workpiece in the magazine. When the supply of workpieces is running short the lever 124 is released and is thereby tilted to actuate a sensing switch.

In addition, FIGURE 2 illustrates a sensing of the correct forward transport of the workpieces as resulting in throwing out of the workpiece which has been machined. This sensing device includes a pivotable plate 97 which is tiltable against the action of a spring (not shown) between a workpiece-receiving position shown in full lines and a workpiece-delivering position shown in dotted lines. When a workpiece is thrown out and hits the sensing plate 97 and thereby tilts the plate to the position shown in dotted lines, a sensing switch is closed. If, however, the sensing device should be damaged so that the plate does not return to the upper position shown in full lines, the sensing device would be of no use and therefore a further switch is included to be closed in response to the returning of the sensing plate 97 to its operative sensing position.

In the instructions to be given to the mechanic who mounts the switches on the machine shown in FIGURE 2 the only requirement is that each switch should be provided with a label bearing a number or other identification mark so that the switch can be later identified.

In FIGURE 2 the switches are shown schematically and the identification numbers are applied to them in any arbitrary sequence.

In order to provide the further layout of the automation the following scheme is suggested:

Two tabulations are drawn up to show the desired interlocking of functions and data, one showing the machine functions with the indication of the respective sensing switches which are actuated in each of the exterior positions of a machine function member and one listing the "independent" sensings, i.e. the sensings such as the workpiece feeling and the workpiece throw-out sensing.

TABLE I

| Function text | | Number of times performed | Inoperative/operative | Controlled by switch No. | NO/NC | Strip |
|---|---|---|---|---|---|---|
| Function no.: | | | | | | |
| $H_2$ | Transport | 1 | Returned | $U_7$ | NO | ✓ |
| | | | Forward | $U_2$ | NO | ✓ |
| $H_1$ | Clamping | 1 | Down | $U_4$ | NO | ✓ |
| | | | Up | $U_3$ | NO | ------ |
| $H_3$ | Drill | 1 | Up | $U_6$ | NO | ------ |
| | | | Down | $U_5$ | NO | ------ |

As apparent from Table I the first column is the column in which a number is assigned to the function member. Simultaneously with drawing up Table I a corresponding identification mark is applied to the cylinder in question.

The second column is a text column briefly describing the function in question.

The third column indicates the number of times the function is performed during the cycle.

The next column indicates for each function the inoperative and operative position respectively as shown returned and forward with respect to the transport, down and up with respect to the clamping and up and down with respect to the drill.

The next column indicates the number of the microswitch which controls or signals the inoperative and operative position of the function in question. The corresponding next column indicates whether the switch has to be wired as a NO-type switch or a NC-type switch, i.e. normally open or normally closed, and the last column is intended to be completed with check marks as the laying out of the system proceeds in the manner to be described in the following:

TABLE II

| Text | Number of times | Switch No. | NO/NC | Strip |
| --- | --- | --- | --- | --- |
| Is starter switch closed? | | $U_1$ | NO | ✓ |
| Is magazine OK? | | $U_8$ | NC | ✓ |
| Is workpiece on way out? | 1 | $U_9$ | NO | ------ |
| Is workpiece out? | 1 | $U_{10(9)}$ | NC | ------ |

Table II is a memory sheet, the first column of which is a text column giving the function of the "independent" sensing in the form of a query. The next column indicates the number of times the sensing is carried out during the cycle, and the next column the number of the switch used for the sensing with the following column identifying the type of switch to be used, or the mode of wiring as NO-type or NC-type.

From Table II it will be apparent that the switches identified as $U_9$ and $U_{10}$ which are adapted to operate in sequence are of the NO-type and NC-type respectively, and it will therefore be obvious that one switch only can be used wired as NO-switch to be closed when the sensing plate 97 tilts downwards and to operate as NC-switch when the mechanical activation of the switch is released and the sensing plate returned to its normal position. Accordingly it is ascertained that one switch only is mounted on the machine and the same number is assigned to the switch as indicated in bracket in Table II.

The next step in the layout is to assort the sensings in the correct sequence.

To enable this, two different types of strips are used, an NO-type strip as shown in FIGURE 5 and an NC-type strip as shown in FIGURE 6. These strips may be appropriately printed strips of the type used in card indexes to be mounted in a suitable frame.

Each sensing function is introduced on a strip according to the information which can be derived from Table I and Table II in the form of a query and using an NO-strip or an NC-strip according to the tables.

As obvious from the foregoing in the present example ten strips will have to be completed irrespectively of the fact that the switch $U_9$ is a single switch because it operates as an NO-type switch as well as an NC-type switch.

As the completion of the strips proceeds the column in the two Tables I and II marked "strip" is marked with a check mark so as to make sure that the complete number of strips has been produced.

As will be obvious from the foregoing, individual strips are hereby provided marked to indicate on each strip each prerequisite condition necessary for a respective machine function.

The strips are thereafter assorted to correspond to the sequence of occurrence of said prerequisites during the cycle.

As will be obvious the first prerequisite for carrying out the cycle is that the starter switch $U_1$ is closed.

The next prerequisite is that the magazine is OK.

The following prerequisite is that the workpiece is brought into position, i.e. that the transport is moved forward.

This causes the workpiece which has been machined previously to fall out and it will therefore be obvious that the next prerequisite is that the sensing switch $U_9$ is mechanically activated to close its NO-type contact and to make sure that the feeler plate 97 has returned to its inoperative position the next prerequisite is that the switch $U_9$ is mechanically inactivated and has closed its NC-type contact.

The following prerequisite is that the clamping member 117 is up.

The workpiece is then clamped and the drilling operation can be performed and accordingly the next prerequisite condition is that the drill is down. It will be obvious that in order to perform the further functions the next prerequisite is that the drill must be up again, thereafter that the clamping member 117 is loosened and eventually that the transport is returned whereafter a new cycle can be allowed.

The strips assorted in this sequence can be mounted on a support such as the kind usually used for card indexes in offices, and the assorted strip sequence can be copied and given to the electrician as a wiring information according to which one terminal, namely the $Ms_1$ terminal, of all the switches is connected through a $y$-line to the $y$-terminal of the socket $U''$ and the other terminal of each of the microswitches to be connected in sequence to the consecutively numbered terminals of the socket $U''$ in the same sequence as that in which the strips are assorted, the connection being provided to the $Ms_2$ terminal or $Ms_3$ terminal respectively according to the coding of NO-type or NC-type on the respective strips.

Simultaneously instruction is given to the electrician to connect all solenoid valves in parallel with one terminal from each solenoid to a common line $x$ to the $x$-terminal of the socket $H''$ and the other terminal from each of the parallelly connected solenoid valves connected to the terminal (A)1, (B)2 and (C)3 corresponding to the numbering of the cylinders with the cylinder $H_2$ to the first terminal, $H_1$ to the next and $H_3$ to the third.

At this stage of the laying out it will be obvious that the remaining prerequisite for running the machine automatically through the planned cycle is to effectively apply the consecutive signals to the machine control means, i.e. the relay means RA, RB and RC to interlock data and machine functions.

The assorting of the strips in sequence of occurrence of the prerequisites during the cycle automatically provides the coincidence of stages of the progressive switch arrangement and occurrence of the corresponding data signal when the data signal cable is connected with the sockets $U'$ and $U''$, because thereby each data signal is automatically assigned to a corresponding stage of the progressive switch arrangement or counter device.

It will be obvious that each stage of the progressive switch arrangement together with each sensing switch effectively provides a coincidence means which is the equivalent of an "and gate."

The complete circuit arrangement on the sensing side therefore can be simplified to be analysed in terms of symbolic logic as schematically illustrated in FIGURE 4, in which a plurality of each of the series connections of a switching stage of the progressive switch arrangement and the corresponding data signal switch means is shown in block form referred to as $CO_1$, $CO_2$, $CO_3$ and $CO_4$ having inputs $I_1$, $I_2$, $I_3$, $I_4$ and outputs $O_1$, $O_2$, $O_3$, $O_4$ respectively.

The counting operation of the progressive switch arrangement which effectively provides a plurality of discrete steps, each of which is an expression of the number of preceding operations of coincidence means effectively provides a memory referred to in FIGURE 4 as PIME and is shown operatively connected to the signal lines through the coincidence means illustrating the operation of the memory means to render the signal lines effective in sequence.

It will be obvious from the foregoing that when at stage number 1 the starter switch $U_1$ is closed this corresponds to the operation of the coincidence means $CO_1$ to provide a signal from the input $I_1$ to the output $O_1$ and simultaneously to store the information that this signal has been provided in the memory means in the form of a discrete step therein with a signal from the memory means to the circuit system to render the line through the coincidence means $CO_1$ ineffective and render the line through the coincidence means $CO_2$ effective to condition this line for operation in response to the operation of the coincidence means $CO_2$ whereby the next signal will be stored in the memory means and the following line be rendered effective, etc.

In FIGURE 4 the function control means or relay means RA, RB, RC . . . are shown separate from the sensing circuit line system, each indicated having two inputs $I'_1$ and $O'_1$ with respect to the relay RA, $I'_2$ and $O'_2$ with respect to the relay RB, and $I'_3$ and $O'_3$ with respect to the relay RC, to indicate the function that each relay assumes the On-position by receipt of a signal to the input I and the Off-position upon receipt of a signal to the input O.

The connection from the coincidence means of FIGURE 4 the outputs of which correspond to the terminal $mh'_1$, $mh'_2$ . . . of FIGURE 1 with the relay means to apply consecutive signals thereto to alternately render the relay means operable and inoperable so as to initiate and terminate the machine functions is adapted to be provided by means of the distributor member $M_2$ which is in the form of a plug to be inserted in the terminals and by appropriate cross-wiring provide the signals to the relay means in desired sequence.

The assorted strips as mounted in the support as described hereabove provide a wiring aid for the plug which in the following will be referred to as the programme plug.

To this purpose the support shown in FIGURE 7 has in addition to the pair of rails or the like adapted to hold the strips a pair of neighboring rails adapted to hold a sheet 101 which has a portion 103 providing columns perpendicular to the lines of the strips and a portion 105 which has intersecting lines of two groups, namely horizontal lines aligning with the strips and vertical lines aligning with the lines of the portion 103.

By introducing in three of the lines of the portion 103 the machine functions in the sequence in which the corresponding machine function members are connected to the command signal line terminals on the machine equipment side and introducing corresponding identification marks for the vertical lines, it is possible to lay out the interlocking of the machine functions and the data by graphically illustrating on the chart effectively provided in FIGURE 8 the correlation between the prerequisites and the respective beginning and termination of the corresponding machine functions.

The horizontal lines represent and correspond to the discrete steps of the counter device and with the machine functions introduced in the vertical lines the layout of the automatic system and thereby the wiring of the programme plug can easily be made by marking the intersecting columns to show the beginning and termination of the machine functions as a function of the data signals by answering the questions given in the horizontal lines.

It will be obvious that in order to initiate a machine function a signal must be applied to the respective relay means from an output which is effective and that each of the output lines $mh'_1$, $mh'_2$ . . . is effective at a stage following the preceding operation of one of the aforementioned coincidence means, i.e. at a stage when the coincidence means related to the machine function which can be initiated is conditioned for operation.

In other words with reference to the foregoing at stage number 1 the system is conditioned for start by closing the starter switch $U_1$ which advances the progressive switch arrangement to stage number 2. At this stage it will find the magazine feeler switch $U_8$ normally closed and provide progression to stage number 3.

At stage number 3 the system is conditioned for the operation of the switch $U_2$ but to operate this switch the forward transport must be effective. This means that the forward transport must be initiated at stage number 3 and accordingly the intersection of line A and the line corresponding to stage number 3 is marked.

The assorted strips hereafter indicate that with the forward transport properly operating, the workpiece which previously has been worked upon falls out, and that the operation of the switch $U_{9(10)}$ causes the advancement to stage number 6 at which the system is conditioned for further advancement upon operation of switch $U_3$. This operation can, however, not be effectuated unless the clamping is effective and therefore the relay RB must be activated to its On-position by a signal at stage number 6. Therefore, the intersection of the line B and the line corresponding to stage number 6 are marked.

By similar analysis it will be found that the conditioning of the system at the other stages necessarily requires that the drill control relay RC must receive an On-signal at stage number 7 and an Off-signal at stage number 8 and that the relay RB must receive an Off-signal at stage number 9 and the relay RA must receive an Off-signal at stage number 10.

With corresponding markings of the intersections of the horizontal and vertical lines a programme chart as shown in FIGURE 8 can be drawn up and given to the electrician with instructions to wire the programme plug by connecting the terminals A, B, and C thereof with each of the terminals identified by figures at the points where the intersections are marked, i.e. connecting the terminal A with the terminals 3 and 10, connecting the terminal B with the terminals 6 and 9, and connecting the terminal C with the terminals 7 and 8.

It will be obvious that when the programme plug wired in this manner is inserted in the corresponding socket, the data and machine functions are interlocked according to the layout here described.

From the foregoing it will be obvious that the programme chart as well as the assorted strips and function sheet mounted on the holder effectively represents a simplified wiring diagram drawn in similarity with FIGURE 4 but in the form of a coordinate system as indicated in FIGURE 9 in which the horizontal lines which effectively represent the coincidence means are referred to by the same reference characters as in FIGURE 4, and in which the vertical lines assigned to the machine functions are shown as double lines to symbolise the IN-and-OUT commands to the machine function means $H_1$, $H_2$ and $H_3$ to initiate and terminate the machine functions.

It will be obvious that this layout substantially reduces the amount of human intelligence necessary in programming to decide what data information each machine control element needs at each stage to produce the desired result.

The only decisions necessary are to select the information and the machine functions and coordinate at each stage the IN-or-OUT condition of the functions.

It will also be obvious from the foregoing that the only qualified work comprises the assorting of the strips to correspond to the sequence of occurrence of the prerequisite condition during the cycle.

Even in the relatively simple example of FIGURE 2 it requires a sufficient survey of the functions to overlook that the stages of the progressive switch arrangement as caused by the operation of the feeler arrangement 97 must precede the clamping operation and in the case of more complex automation layout, an assorting aid will be of substantial help.

It is therefore recommended to draw up, in addition to

Table I and Table II previously shown, an assorting aid table as follows:

TABLE III

| No. | Text | Operative position | Sequence | Process movements and sensings following operation |
|---|---|---|---|---|
| $H_1$ | Clamp | Up | 2 | Clamping of workpiece, closing of $U_3$. |
| $H_2$ | Transport | Forward | 1 | Engages workpiece and moves workpiece forward, old workpiece falls out and hits 97, closing of $U_2$. |
| $H_3$ | Drill | Down | 3 | Drilling of hole, closing of $U_5$. |

The first column indicates the symbol assigned to the machine function on the label put on the cylinder in question. The next column indicates the operative position of the machine function member, and the next column indicates the sequence in which the machine function members operate.

The last column includes text briefly describing what happens in the machine by the movement of the respective machine function members to their operative position.

From Table III it will be obvious that the text which describes what happens when the transport of the material takes place makes it clear that the workpiece moves forward and causes the old workpiece to fall out whereby it hits the feeler arrangement 97 and that eventually the sensing switch $U_2$ is closed.

This leaves no doubt that the stages of the progressive switch arrangement caused by the operation of the feeler arrangement 97 must precede the closing of the switch $U_2$.

By laying out a brief description of the movements caused by the movement of anyone of the machine function members to their operative position in the manner indicated in Table III, it will be easy to determine the correct sequence of any "independent" sensings relatively to the sensings directly assigned to the machine function means.

The only "independent" sensings of FIGURE 2 which cannot be placed definitely in sequence by drawing up a table like Table III is the workpiece sensing by means of the switch $U_8$. It will be obvious, however, that with the character of the sensing device shown, it is immaterial whether the sensing as shown is provided at stage number 2 or at the end of the cycle, because there will always be a few workpieces left in the magazine and the machine will not run idle if the sensing switch $U_8$ has been opened at the beginning of the cycle and does not function to advance the progressive switch arrangement at stage number 10.

It will be possible, however, within the scope of the invention to design the sensing of the presence of the lowest workpiece by means of an NO-type switch mounted below the transport channel to be mechanically activated by means of the lowest workpiece in the magazine, and in such event the sensing switch must signal the presence of a workpiece as a prerequisite condition for allowing the forward transport to take place. That this is necessary appears from the text assigned to the transport in Table III, because the first function of the transport is to engage the workpiece and move it forward, from which it will be obvious that there must be a workpiece to be engaged whereby this will be an indication to the person who makes the layout that the operation of the magazine sensing switch must precede the activation of the transport.

In more complex systems an operation may be performed a plurality of times during the machine cycle.

As indicated on Table I, the third column indicates the number of times the operation is performed.

The machine equipment of FIGURE 2 may within the scope of the invention be modified to operate on lengthy workpieces, each of which by the forward stroke of the transport control is brought into two different positions relatively to the drill with the purpose of drilling a hole adjacent each end of the workpiece.

It is obvious that this will cause each of the machine function members to operate two times during the cycle and accordingly Table IA is drawn up as shown below.

Since the sensings or prerequisite conditions necessary which are assigned to the machine functions in this event are repeated, two strips are marked for each of the sensings shown in Table IA which are assigned to a machine function which occurs twice. In order to facilitate the following assorting of the thus marked strips to correspond to the sequence, it is advisable to modify the text to indicate on the marked strips whether the function is the first occurrence or the second occurrence, such as for example:

Is first clamping effective—$U_3$
Is second clamping effective—$U_3$
Has first hole been drilled—$U_5$
Has second hole been drilled—$U_5$ As will be obvious it is the same switches which are identified on the strips because there are no other switches but they operate during the cycle a different coincidence means by being effectively assigned to one stage of the progressive switch arrangement at the first occurrence of their operation and assigned to a subsequent stage of the progressive switch arrangement at the second occurrence of operation.

From the foregoing it will be obvious that in this event there is a double set of strips relating to the sensing performed by the switches numbered $U_2$, $U_3$, $U_4$, $U_5$, $U_6$ and $U_7$ marked to indicate the first and second occurrence of the sensing by means of these switches.

To facilitate the assorting of the strips it will be found convenient to define the beginning of a cycle to be a machine condition at which the last operation on a workpiece has been performed and all the machine function members are in their inoperative position, i.e. the opposite position of that defined in Table III.

With this definition it will be obvious that there will be a workpiece present in the transport channel in which the second hole near the rear end of the workpiece has been drilled, and that the first transport stroke which brings the next workpiece in position to have a hole drilled near the front end will result in throwing out the workpiece, the drilling of which has been completed.

Hereby it will be obvious that the sequence of the strips in which they have to be assorted will be as shown on the modified programme chart of FIGURE 10 insofar as the first ten stages is concerned is identical with the programme chart of FIGURE 8.

TABLE IA

| | Function text | Number of times performed | Inoperative/operative | Controlled by switch No. | NO/NC | Strip |
|---|---|---|---|---|---|---|
| Function No.: | | | | | | |
| $H_2$ | Transport | 2 | Returned | $U_7$ | NO | |
| | | | Forward | $U_2$ | NO | |
| $H_1$ | Clamping | 2 | Down | $U_4$ | NO | |
| | | | Up | $U_3$ | NO | |
| $H_3$ | Drill | 2 | Up | $U_6$ | NO | |
| | | | Down | $U_5$ | NO | |

With the drilling of two holes, however, another six stages are added, numbered 11–16 and corresponding to the stages 2–10 with the omission of the stages 3 and 4, because no workpiece is thrown out between the second transport operation and the second clamping.

It will also be obvious that with the exception of the necessary adjustment of the forward stroke and corresponding adjustment of the appertaining sensing switches $U_2$ and $U_7$, which is a mechanical problem only, the machine of FIGURE 2 can be conditioned to drill the two holes by adding the connection shown in dotted lines in FIGURE 2, i.e. from the sensing line $us_2$ to terminal number 11 in addition to the connection with terminal number 3, connecting the line $us_3$ with terminal number 12 in addition to the connection with terminal number 6, etc. so as to render the second occurrence of operation of the respective switches included in the sensing lines coincidental with the further stages of the progressive switch arrangement.

It will also be obvious from FIGURE 10 that with the additional connections shown in dotted lines in FIGURE 2 and appropriate adjustment of the stroke of the transport stroke to enable the two holes to be drilled, the only necessary modification of the control apparatus shown in FIGURE 1 is to replace the programme plug wired according to the programme chart of FIGURE 8 with another programme plug wired according to the programme chart of FIGURE 10.

It will be obvious that the simplicity of laying out the system is based on the fact that each of the lines which correspond to the stages of the progressive switch arrangement effectively represents the conditioning of the data signal line to transmit a data signal upon operation of the coincidence means included in the line, and that the system is so that only On- or Off-signals to the machine functions are necessary. In other words it is easy to locate for each conditioning of a data signal line the intersection between the corresponding horizontal line of the programme chart and that one of the vertical lines of the programme chart which represents the corresponding machine function which, when rendered effective or ineffective causes the operation of that specific sensing means which is conditioned for operation.

In other words, the general rule with respect to the way of interlocking data and functions on the programme chart is that the beginning of each machine function can be found by following the vertical line assigned to the machine function to the point of intersection with that horizontal line which contains the question: Is the machine function in question rendered effective. In the same manner the termination of each machine function can be located by following the vertical line which corresponds to the machine function in question to the point of intersection with the horizontal line which contains the question: Is the machine function in question rendered ineffective.

As will be obvious the invention provides a graphical illustration which is useful as an aid to interlock machine functions and machine data in the form of a sheet having a first column, the lines of which are adapted to selectively receive information about the perequisites for initiating and terminating the machine functions, and a second column having lines intersecting the lines of the first column adapted to receive information about the machine functions.

In addition, as shown on the programme chart of FIGURES 8 and 10, and explained with reference to FIGURE 9, the graphical illustration effectively provides a simplified diagram and as shown on the programme charts of FIGURES 8 and 10 the programme charts may show a simplified wiring by illustrating the lines $x$ and $y$ and the connection with these lines to the respective sensing switches and the terminals numbered which are connected with the sensing switches as well as with the machine function members.

In addition to being an aid for laying out the programme, the programme chart by representing a simplified circuit using symbolic logic is also effective as an aid for locating faults, if any, occurring during the automatic operation of the machine.

For this reason I prefer, in addition to the original programme chart which is kept in the office, to let a copy of the programme chart go with the machine as long as it operates to perform the programme of the chart.

It will be obvious that the programme chart as effectively representing a simplified diagram provides for immediate location of a fault in the event that the machine is stopped during the automatic cycle, only by adding to or including in the circuit arrangement indicator means operable to signal the stage of the progressive switch arrangement at which the automatic cycle has been interrupted.

Such indicator means may be in the form of a plurality of signal lamps, such as discharge lamps, assigned to each of the data signal lines of the control apparatus and identifiable by corresponding stage numbers so as to signal immediately the number of stage at which the automatic cycle may be interrupted.

In such event it will be understood that if in the case of a machine according to FIGURE 2 the signal lamp or indicator system included in the circuit arrangement shows that the progressive switch arrangement has not been advanced from stage number 5, an immediate inspection of the programme chart of FIGURE 8 shows that the prerequisite condition which has not been fulfilled is that the feeler has not been moved up. It will then only be a matter of seconds to inspect the machine and find out that for example the spring which returns the feeler plate 97 to its inoperative position has become defective, or that perhaps a sticky workpiece has been hanging on the plate 97 and prevents it from moving up.

The use of the programme chart in fault-finding hereby clearly obviates complicated fault-finding circuitry to be included in the control apparatus, and it will be possible as shown in FIGURE 11 to have a separate auxiliary network to be used with a plurality of control apparatuses for the purpose of fault-finding therewith by being plugged in.

In more detail in FIGURE 11 an auxiliary network is shown in combination with the data signal lines of the control apparatus shown in FIGURE 1. Basically the auxiliary network which is generally referred to by SN includes a manually operable stepping switch having a movable finger PU and a plurality of contacts each of which is connected with one of a plurality of lines $S_{u1}$, $S_{u2}$ . . . adapted to be connected with the data signal lines of the progressive switch arrangement in the control apparatus. The network further includes a line $y_s$ which is connected to the finger PU through a push-button switch PSU to a terminal adapted to be connected with the $y$-terminal of the progressive switch arrangement. The push-button is shunted by a signal lamp ISL such as a low-voltage discharge lamp.

As will be obvious the auxiliary network is connected to the control apparatus in the manner shown in FIGURE 11 and effectively provides a means for indicating that one of the data signal sensing lines which is effective at each stage of the progressive switch arrangement, because when the movable finger PU is operated to selectively establish contact with the stationary contacts, the indicator lamp ISL will signal the operativeness of a line in response to coincidence of the stage of the finger PU and the corresponding stage of the progressive switch arrangement.

It will thus be obvious that when prior to the operation of the working machine the laying out of a graphical illustration has been made to show each of the discrete steps of the progressive switch arrangement with the respective sensing means assigned thereto in the horizontal lines of the programme chart and each of the machine function members in the vertical lines of the programme chart with the intersection of the horizontal and vertical lines marked to indicate the correlation of the discrete steps of the progressive switch arrangement and the machine functions, the auxiliary network SN provides in combination with the programme chart an aid to facilitate fault-finding in the event that the automatic cycle of the working machine has stopped. In such event the data signal cable is disconnected from the control apparatus and instead the auxiliary network SN is plugged in whereafter the manually operable switch PU is moved stagewise until the coincidence of the stage of the manual switch with that stage at which the progressively operable switch has been stopped is indicated by the signal lamp ISL. This obviously indicates the discrete step at which a fault has discontinued the automatic operation of the machine, and in order to locate for inspection the sensing means and the correlated machine function means assigned to the discrete step in question, it is only necessary to follow that line of the graphical illustration which is assigned to the discrete step, i.e. the horizontal step line.

In that line an identification of that sensing switch which has not operated is found that the first thing to be inspected on the machine therefore obviously is that switch. In most cases it will be visually clear from the machine why the operation has not been completed which should cause the closing of the sensing switch in question, or alternatively if the machine function has been completed and the switch is actuated, it will be obvious that the fault lies in the switch.

Though in the foregoing I have described the invention in great detail, it will be obvious that the invention and the manner in which it can be used is not limited to machine tools, and that the machine function members may be of any kind, such as electrical motors adapted to drive parts of a working machine, speed controls for such motors, or the control means may in the event that the working machine is a chemical plant be in the form of electrical heaters or electrical actuators for valves in pipelines, or in the form of any power converting and actuating means which drives the process machinery of a working machine of any kind.

Also the data signal means may, depending on the character of the working machine, be in the form of any devices for sensing variables such as temperature, pressure, vibration, humidity, speed, time, etc. and being able to produce data signals responsive to such sensing.

I claim:

1. A method for interlocking machine functions and machine data for running a working machine having a plurality of machine function means operable to carry out machine junctions and electrical actuators therefor, adapted to be actuated by command signals, and a plurality of sensing devices adapted to produce information signals of machine data to provide data-responsive automatic control of said machine functions by means of an electrically controlled counter device having a plurality of inputs operable in predetermined sequence to effectively count the data signals as they occur in discrete steps and a plurality of outputs operable to be rendered effective in the sequence of said discrete steps, comprising the steps of: laying out a graphically illustration having two groups of columns with intersecting lines, connecting said counter inputs with said machine sensing devices to effectively render each of said discrete steps effective only in response to each of said information signals, listing said machine data in their cycle sequence in sequential lines of one column of said graphical illustration, listing said machine functions in the lines of the second of said columns of said graphical illustration, marking the intersections of said columns with the beginning and termination of said machine functions as functions of said machine data throughout said cycle, and effectively providing the electrical connections between said counter outputs and said machine function actuators in accordance with the markings of said intersecting columns.

2. A method for interlocking sequential actuation of a plurality of machine functions of a working machine having means producing said work functions with a plurality of sensing signals representing machine data produced in sequence and each representing a prerequisite for further progress of the operation of the working machine comprising the steps of: laying out a graphical illustration having two columns with intersecting lines, laying out the information supplied by said sensing signals in their sequence of occurrence and listing the same in said sequence in the lines of one of said columns of said graphical illustration, listing said machine functions in the lines of the other column of said graphical illustration, marking the intersections of said second column lines to indicate the correlation of the beginning and termination of each machine function with the respective sensing signals which is a prerequisite therefor, causing said sensing signals to be counted by a progressive switch arrangement having outputs operable to be rendered effective in sequence to deliver command signals, and effectively providing command connections between said outputs and said machine function means to render the latter effective to begin and terminate their functions in accordance with said indicated correlation.

3. A method of automating a working machine having a plurality of machine function means to be automatically run through a cycle following a predetermined sequence by means of a control apparatus having an electrical counter device with a plurality of discrete steps, a plurality of input lines connected to said counter device each assigned to a predetermined one of said discrete steps, and a plurality of output lines connected to said counter device each assigned to one of said discrete steps comprising the steps of: laying out a graphical illustration of the sequence control of the automatic cycle, installing on said working machine a plurality of sensing devices capable of producing electrical information signals each assigned to a predetermined machine data during said predetermined cycle, installing on said working machine a plurality of electrical control means for said machine function means each being operable to be actuated by means of an electrical command signal, determining the proper sequence of said information signals, wiring said sensing devices into a plurality of machine output lines each of which is assigned to a predetermined one of said information signals, connecting said machine output lines for said information signals with said counter device input lines of said control apparatus to effectively provide the same sequence of the discrete steps of said counter device as the sequence of said information signals during the predetermined cycle, wiring said machine control means into a plurality of command signal input lines of said machine and conforming the effective interlocking between said information signals and said machine functions to said graphic illustration of the relation between said information signals and the beginning and termination of said machine functions, and wiring the connections between said output lines from said counter device in said control apparatus and said command signal input lines of said machine as indicated by said graphical illustration.

4. A method of automating a working machine having a plurality of machine function members to be automatically run through a cycle following a predetermined sequence by means of a control apparatus having a progessive switch arrangement, effectively providing a plurality of discrete steps and being operatively connected with a plurality of input lines each assigned to a predetermined one of said discrete steps as well as being operatively connected with a plurality of output lines, each assigned to one of said discrete steps, comprising the steps of installing on said working machine a plurality of sensing devices capable of producing electrical information signals during said predetermined cycle, installing on said working machine a plurality of electrically controlled machine function members each being operable to be actuated by means of an electrical command signal, laying out the sequence of occurrence of said information signals throughout said cycle, laying out a graphical illustration having a first plurality of lines each effectively representing the coincidence of a discrete step and the respective sensing device assigned thereto and a second plurality of lines intersecting said first lines effectively representing machine functions, connecting said sensing devices with said progressive switch arrangement to effectively provide the same sequence of the discrete steps of said progressive switch arrangement as the sequence of said information signals during the predetermined cycle, listing said sequence in said first plurality of lines of said graphical illustration, listing said machine functions in said second lines of said graphic illustration, marking the intersections of said lines to indicate the relation between said information signals and the beginning and termination of said machine functions, and wiring the connections between said output lines from said progressive switch arrangement and said machine function members as indicated by said graphical illustration.

5. A method of providing automatic sequence control of a working machine having a plurality of machine function means by means of a numerical control apparatus operable to effectively count information signals to be represented by numerical values at a plurality of discrete stages and including stage responsive means operable to effectively provide consecutive command signals, comprising the steps of installing on said working machine a plurality of sensing means each capable of producing an electrical information signal assigned to a predetermined machine data during operation of said machine through a predetermined cycle, installing on said working machine a plurality of electrical control means for said machine function means, each being operable to be actuated by a control signal, laying out the sequence of said information signals throughout said cycle in one direction in a graphical co-ordinate system, laying out the machine functions in the other direction of said co-ordinate system, connecting said sensing means to effectively provide sequential processing of said information signals only by said control apparatus to provide said numerical values, marking said co-ordinate system to indicate the beginning and termination of each machine function as a function of the respective information signal and connecting said machine control means with said control apparatus to render said command signals effective to begin and terminate respective machine functions as indicated by said coordinate system.

6. A method for automating a working machine having a plurality of operation performing means to be automatically run through a predetermined cycle by means of a control apparatus which has an electrical counter device capable of providing counting of electrical signals represented by a plurality of discrete steps and capable of rendering a plurality of output lines effective in sequence, comprising the steps of: installing on the working machine a plurality of sensing means capable of producing electrical counter device capable of providing counting of electrical signals represented by a plurailty of discrete steps and capable of rendering a plurality of output lines effective in sequence, comprising the steps of: installing on the working machine a plurality of sensing means capable of producing electrical information signals representative of machine data during the cycle of operations, laying out the sequence of said information signals, connecting said sensing means with said counter device to effectively provide conformity between the sequence of said information signals and the discrete steps of said counter device, installing electrical control means for said machine function members capable of controlling the beginning and termination of each machine function by means of a command signal, laying out a graphical illustration of the functional relationship between the information signals and the beginning and termination of respective fuctions, and connecting the function control means with said counter device in accordance with said graphical lay-out.

7. A method for automating a working machine having a plurality of operation performing means to be automatically run through a predetermined cycle by means of a control apparatus which includes an electrical counter device capable of processing electrical data signals to be represented by a plurality of discrete steps and as well as being capable of effectively providing a plurality of step-responsive command signals, and a plurality of on-off-type control means operable to be switched between alternate operating conditions upon receipt of consecutive command signals, comprising the steps of: installing on the working machine a plurality of sensing means capable of producing said electrical data signals, each being representative of a machine data during the cycle of operations, laying out the sequence of said data signals, connecting said sensing means with said counter device to effectively provide conformity between the sequence of said data signals and said discrete steps of aid counter device, intalling on said working machine electrical control means for said operation performing means, connecting said electrical control means with said on-off-type control means, laying out a graphical illustration of the functional relationship between said data signals and the beginning and termination of respective functions, and connecting said on-off-type control means with said counter device to effectively apply said command signals to said on-off-type control means to render them effective and ineffective to begin and terminate said machine functions in accordance with said graphical illustration.

8. A method for laying out the sequence control of an automation system for a working machine utilizing numerical control means having a plurality of stages and effectively providing together with a plurality of sensing means on the working machine a plurality of coincidence means and memory means rendering said coincidence means operable in sequence and adapted to selectively control the initiation and termination of a plurality of machine functions, each being controlled by respective control means, comprising the steps of marking individual strips to indicate on each strip one prerequisite condition necessary for the operation of a coincidence means with identification of the respective data signal means which is assigned to said coincidence means on each strip, assorting the thus marked strips to correspond to the numerical values assigned to the operation if each of said concidence means, mounting the thus assorted strips in a support adapted to receive a sheet having two groups of intersecting lines to retain the respective sequence of said strips in one group of said intersecting lines, laying out each of the corresponding machine funtcions in the other group of intersecting lines and graphically illustrating on said sheet thus produced on said support the correlation between the operation of said coincidence means and respective initiation and termination of the machine functions by marking each line assigned to a machine function at the point of intersection with the lines assigned to that coincidence means which is rendered operative upon effectuated beginning of the machine function.

9. A method for laying out the sequence control of an automation system for a working machine utilizing numerical control means having a plurality of stages and effectively providing together with a plurality of sensing means on the working machine a plurality of coincidence means and memory means rendering said coincidence means operable in sequence and adapted to selectively control the initiation and termination of a plurality of machine functions, each being controlled by respective control means, comprising the steps of marking individual strips to indicate on each strip one prerequisite condition necessary for the operation of a coincidence means with identification of the respective data signal means which is assigned to said coincidence means on each strip, assorting the thus marked strips to correspond to the occurrences of said coincidences during the cycle, mounting the thus assorted strips in a support adapted to receive a sheet having two groups of intersecting lines, so as to retain the respective sequence of said strips, laying out on said sheet in one group thereof, each of the corresponding machine functions and mounting said sheet on said support with the lines of the other group intersecting said machine function lines in alignment with the lines effectively provided by said strips, and graphically illustrating on said sheet thus produced on said support the correlation between the operations of said coincidence means and respective initiation and termination of the machine functions by marking each line assigned to a machine function at the point of intersection with the lines assigned to that coincidence means which is rendered operative upon effectuated beginning of the machine function.

10. Fault-finding means for use with an automatic system including a working machine having a plurality of sensing means operable to produce data signals and a plurality of electrically controlled machine function means operable to perform machine functions and sequence control means effectively providing a plurality of discrete steps and being connected with said sensing means to render each data signal expressed by a predetermined discrete step as well as being connected with said machine function means to control the initiation and termination of each machine function at predetermined ones of said discrete steps, comprising the combination of a graphical illustration simulating the wiring connections between the sequence control means and the sensing as well as receiving function means and having columns with intersecting lines in one set of which said discrete steps with respective sensing means assigned thereto are listed in operation sequence and in the other set of which the respective machine functions are listed, and the intersections of said lines are marked to indicate the correlation of said discrete steps and said machine functions, and a manually operable multistep switch means with step indication signal means, circuit means including said multistep switch means and means for effectively connecting said circuit means with said sequence control means to render said step indication means effective to indicate the effective discrete step of said control means.

11. In a system for performing a predetermined program to be carried out by means of a plurality of operations, the start and stop of each of which is conditioned upon the fulfillment of the plurality of data which are produced as the program proceeds and each being indicating of a programmed stage, in combination:
- a coordinate system having a plurality of intersecting points between two sets of intersecting lines, of which one set of lines is assigned to the data signals in the sequence in which they occur during the program and the other set of lines are assigned to the operations with the start and stop of each operation being marked at the intersections responsive to the fulfillment of the conditions as indicated by data signals for the start and stop of each operation,
- and a plug board connecting the data signal lines with command signal lines in accordance with the marking of the intersection points.

References Cited

UNITED STATES PATENTS

| | | | |
|---|---|---|---|
| 2,535,767 | 12/1950 | Warner | 35—19.1 |
| 2,764,821 | 10/1956 | Buitenkant | 35—13 |
| 1,286,232 | 12/1918 | Coats | 35—19 |

OTHER REFERENCES

Rand Reac Manual by A. S. Mengel and W. S. Melahn, ASTIA Document No. ATI 210675, pp. 122–126.

Functional Description of the EDVAC, vol. 2, November 1949, pp. A.1–6 to A.1–12.

DONALD J. YUSKO, Primary Examiner

U.S. Cl. X.R.

35—8